(12) United States Patent
Petto

(10) Patent No.: US 7,913,438 B2
(45) Date of Patent: Mar. 29, 2011

(54) METHOD FOR ARRANGING AND STORING AN IN-PROGRESS PAGE AND ARTICLE THEREOF

(76) Inventor: Mary J. Petto, Marlboro, NJ (US)

( * ) Notice: Subject to any disclaimer, the term of this patent is extended or adjusted under 35 U.S.C. 154(b) by 701 days.

(21) Appl. No.: 11/564,933

(22) Filed: Nov. 30, 2006

(65) Prior Publication Data

US 2008/0031681 A1 Feb. 7, 2008

Related U.S. Application Data

(60) Provisional application No. 60/807,681, filed on Jul. 18, 2006.

(51) Int. Cl.
G09F 7/04 (2006.01)

(52) U.S. Cl. .................. 40/600; 40/661.01; 40/124.04; 40/621

(58) Field of Classification Search .................. 40/600, 40/661.01, 124.04, 621, 711
See application file for complete search history.

(56) References Cited

U.S. PATENT DOCUMENTS

| 3,456,373 | A | * | 7/1969 | Epton | 40/124 |
| 3,928,921 | A | * | 12/1975 | Gurman | 434/428 |
| 5,282,631 | A | * | 2/1994 | Baker | 273/272 |
| 5,384,999 | A | * | 1/1995 | Roche et al. | 52/764 |
| 5,495,686 | A | * | 3/1996 | Millard et al. | 40/621 |
| 6,775,935 | B1 | * | 8/2004 | Cohen et al. | 40/600 |
| 2003/0003256 | A1 | * | 1/2003 | LeVine et al. | 428/40.1 |
| 2003/0122365 | A1 | * | 7/2003 | Mathews-Lingen | 281/22 |
| 2005/0186439 | A1 | * | 8/2005 | Staadecker et al. | 428/480 |

OTHER PUBLICATIONS

"Pictures from home & garden photos" http://home-and-garden.webshots.com/photo/11841147000591631555jYJYkg, Sep. 5, 2004.*
"Enclosed Panels," http://web.archive.org/web/20020907204126/http://www.magneticconcepts.com/enclosed_panels.htm, Sep. 7, 2002.*
"Board on Flickr," http://www.flickr.com/photos/andrewcoulterenright/8153527/, Apr. 1, 2005.*
"Star wars on Flickr," http://www.flickr.com/photos/blognamelagna/14804764/, May 20, 2005.*
"Magnetic Precision Mat Kit", http://www.basicgrey.com/catalog/product_info.php?cPath=40&products_id=686, Printed from BasicGrey web site on Mar. 2, 2007.

* cited by examiner

*Primary Examiner* — Gary C Hoge
(74) *Attorney, Agent, or Firm* — Moser IP Law Group

(57) ABSTRACT

A method and an article for arranging and storing a page or presentation that is in progress comprising the steps of placing at least one page on a magnetic substrate, wherein the magnetic substrate is sized to receive the at least one page; arranging at least one page-element onto the at least one page; and placing at least one magnet onto the at least one page-element to hold the at least one element in place. An additional aspect of the embodiment comprises the step of covering the at least one page that is in progress. Yet another aspect of the embodiment comprises the step of storing the magnetic substrate with the at least one page and at least one page-element until the at least one page is completed at a later time.

14 Claims, 3 Drawing Sheets

US 7,913,438 B2

METHOD FOR ARRANGING AND STORING AN IN-PROGRESS PAGE AND ARTICLE THEREOF

CROSS-REFERENCE TO RELATED APPLICATIONS

This application claims the benefit of U.S. Provisional Patent Application Ser. No. 60/807,681, filed on Jul. 18, 2006, of which is incorporated herein by reference in its entirety.

BACKGROUND

1. Field of the Invention

Embodiments of the present invention generally relate to scrapbooks and memory albums and in particular to a method of arranging and storing a scrapbook page that is in progress, and an article thereof.

2. Description of the Related Art

Scrapbooking, a method for journaling written history in the form of photographs, printed media, and memorabilia contained in decorated albums, or scrapbooks, has taken off as a hobby and as a career in recent years and is now a multi-billion dollar industry with a large number of companies creating scrapbooking products. Across the world, scrapbooking participants, referred to herein as "scrappers," get together and scrapbook at each other's homes, local scrapbook stores, scrapbooking conventions, and the like. The term "crop" in scrapbooking often is used to describe these events, as a reference to cropping, or trimming, printed photographs to be placed in scrapbooks.

Currently, scrapbooking is done largely on pages of different sizes, such as, for example, 12 inches×12 inches or 8.5 inches×11 inches, although smaller albums are becoming quite popular. Various accessories, referred to as "embellishments," are used to decorate scrapbook pages. Embellishments include stickers, die cuts, fancy lettering and trinkets to decorate and personalize each page. Scrapbooking tools often include one or more albums, special album pages and protective sheets, specific adhesives, "cropping" tools, such as specifically shaped cutting devices to trim and edge photos and paper into specific shapes, and stencils for decorating the pages of the scrapbook.

Creating a scrapbook page typically comprises strategically laying out page elements such as, for example, multiple photos, memorabilia, and decorative articles on an album page prior to affixing the articles to the page, often layering different articles before affixing them to a page. For example, a photo may be glued to a backing sized slightly larger than the photo, followed by a decorative paper frame attached to the top of the photo to outline the photo.

Creating scrapbooking pages often is a time-consuming process with each page being a tedious exercise in carefully placing each article to be affixed. If a scrapper is interrupted when the layout of a page is in progress, the scrapper will have to remove all the articles from the page and remember the specific placing of the articles once going back to complete the page. This often requires the scrapper designing the page from scratch when the scrapper has time to get back to completing the page.

Additionally, designing the scrapbook page often requires page planning for a specific size of a scrapbook page prior to placing the elements on the scrapbook page. For example, a scrapper may lay out the elements to be placed onto a page and move elements around before actually placing and affixing the elements to a scrapbook page. Page planning prior to using a scrapbook page reduces the opportunity for scrapbook pages to be damaged during the page planning process, however without the scrapbook page, the scrapper typically has to layout the page elements blindly without the guide of the scrapbook page outline.

There exists a need for a scrapper to easily retain the design of a scrapbook page in progress when interrupted during the design process. In addition, there exists a need to provide scrapbook page outlines for page planning without the use of an actual scrapbook page.

SUMMARY

Embodiments of the present invention are directed to a method for arranging and storing a page or presentation that is in progress comprising the steps of placing at least one page on a magnetic substrate, wherein the magnetic substrate is sized to receive the at least one page, arranging at least one page-element onto the at least one page to create a design, and placing at least one magnet onto the at least one page-element to hold the at least one element in place. An additional aspect of the embodiment comprises the step of covering the at least one page that is in progress. Yet another aspect of the embodiment comprises the step of storing the magnetic substrate with the at least one page and the at least one page-element until the at least one page is completed at a later time.

Another embodiment of the present invention is directed to an article for arranging and storing a page or presentation that is in progress comprising a magnetic substrate sized to receive at least one page, and a plurality of magnets, wherein the plurality of magnets are used to hold the at least one page and at least one page-element in an arranged position on the at least one page against the magnetic substrate. The embodiment may further comprise a cover to place over the at least one page, the at least one page-element, and the plurality of magnets.

According to another embodiment of the present invention an article for arranging and storing a scrapbook page that is in progress comprises a container sized to receive at least one scrapbook page, a magnetic base within the container, a plurality of magnets, wherein the plurality of magnets are used to hold the at least one scrapbook page and at least one page-element in a predetermined position on the at least one scrapbook page against the magnetic base, and a cover to securely cover the at least one scrapbook page, the at least one page-element, and the plurality of magnets in the container.

In yet another embodiment, an article for arranging and storing a page or presentation that is in progress comprises a magnetic substrate sized to receive at least one page, a plurality of magnets, wherein the plurality of magnets are used to hold the at least one page and at least one page-element in an arranged position on the at least one page against the magnetic substrate; and at least one outline drawn on the magnetic substrate, wherein the outline is sized substantially similar to the at least one page.

DETAILED DESCRIPTION

Figure 1A:
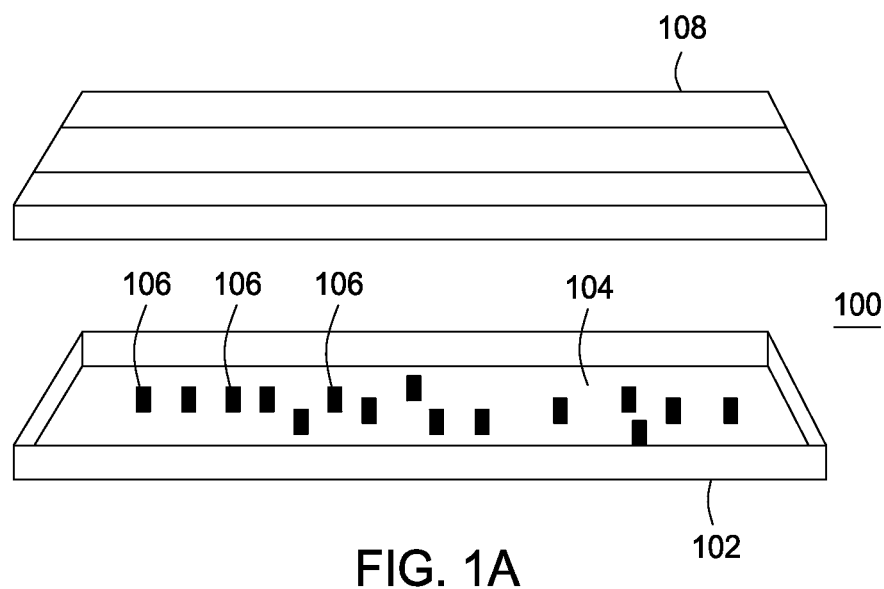
FIG. 1A is an exploded perspective view of an article for arranging and storing a scrapbook page, in accordance with an embodiment of the present invention.
Figure 1B:
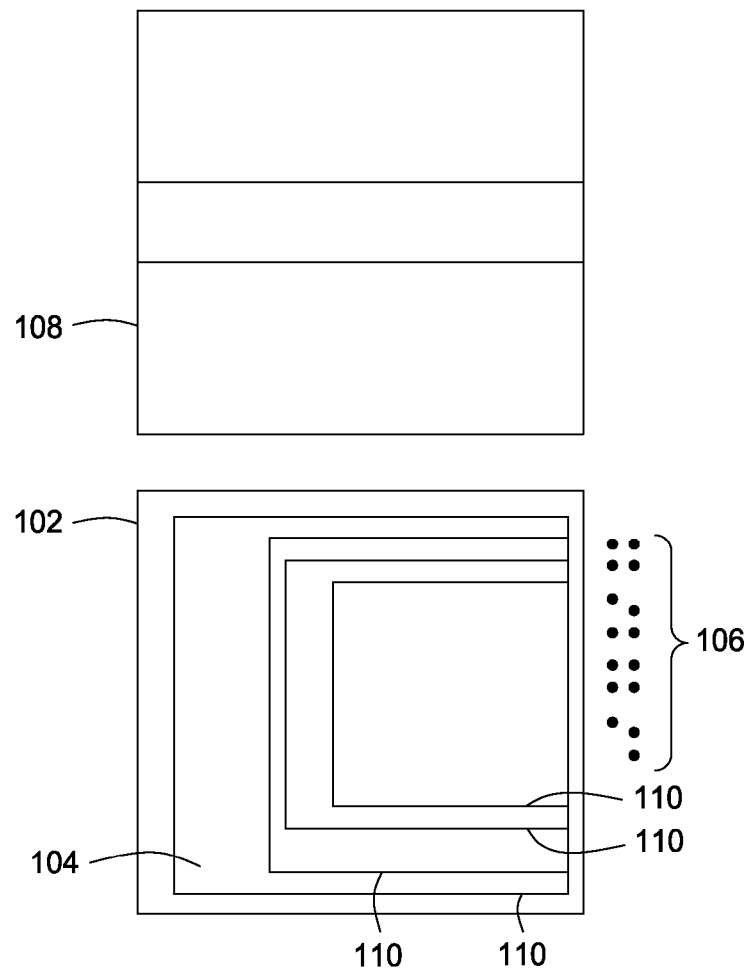
FIG. 1B is a top plan view of the article described in the embodiment of FIG. 1A.

FIGS. 1A and 1B depict an article for arranging and storing a scrapbook page that is in progress, according to an embodiment of the present invention. As shown in FIG. 1A, an article 100 comprises a rectangular container base 102 and a substantially similarly shaped container lid 108, both sized to receive a common scrapbooking page, such as 12 inches×12 inches. The base 102 includes a magnetic substrate 104 upon which a plurality of magnets 106 may be placed to hold a scrapbook page, one or more page-elements, such as photos, embellishments, and the like. In an embodiment of the present invention, the magnetic substrate 102 may be removed from the base 102.

The magnetic substrate 104 may comprise a thin magnetic sheet dimensionally sized to fit within the container base 102. In another embodiment of the present invention, a magnetic substrate 104 also may comprise a grid of magnetic strips, a mesh of interwoven magnetic fibers, a thin magnetic plate, any combination thereof, and the like. In an embodiment of the present invention, the magnetic substrate is made substantially of a galvanized metal, such as steel, iron, and the like.

The magnets 106 may be any type of magnet used to hold papers, photos, and the like in place, such as, for example, cylindrically-shaped neodymium magnets. Although the embodiment of FIG. 1A depicts an article that is shallow in depth and sized to fit a 12 inch×12 inch scrapbook page, other embodiments within the scope of the invention may cover articles of any depth, shape, and size.

The magnetic substrate 104 may further comprise a top surface material that covers the thin magnetic sheet. In an embodiment of the present invention, the top surface material comprises a material such as laminated paper, a plastic polymer material, any combination thereof, and the like. The plastic materials may include polyethylene polymers, polypropylene polymers, vinyl, polyvinyl chloride, and the like.

The top surface material may be a self-healing top surface material such that a user may arrange a scrapbook page, and/or one or more page-elements on the top surface and hold the page and/or page-elements in place with one or more of the magnets 106. The user then may use a cutting device to cut and shape the scrapbook page and/or page-elements without permanently cutting into and degrading the top surface material. In an embodiment of the present invention, a self-healing top surface material comprises a self-healing plastic material, such as a polyethylene polymer, a polypropylene polymer, vinyl, polyvinyl chloride, and the like. In another embodiment of the present invention, a self-healing top surface comprises a non-plastic material, such as glass or wood, such as, for example, RHINOLIN, and the like.

As shown in FIG. 1B, the magnetic substrate 104 may have one or more outlines 110 sized substantially similar to common scrapbook pages, such as 8.5 inches×11 inches, 6 inches×6 inches, and the like. A user may place a scrapbook page on an outline 110 of the container base 102 and hold the scrapbook page in place using one or more of the magnets 106, which adheres to the magnetic substrate 104. The user then may place multiple items on the page and hold them in place using the magnets 106, where the multiple items eventually will be permanently affixed to the page. If the user is unable to complete the page prior to permanently affixing the items to the page, the user may close the article 100 using the container lid 108 and know that the items are held securely in place by the magnets 106 such that the items will not move even though the article 100 may be moved. The article 100 may be used repeatedly as needed.

Figure 2:
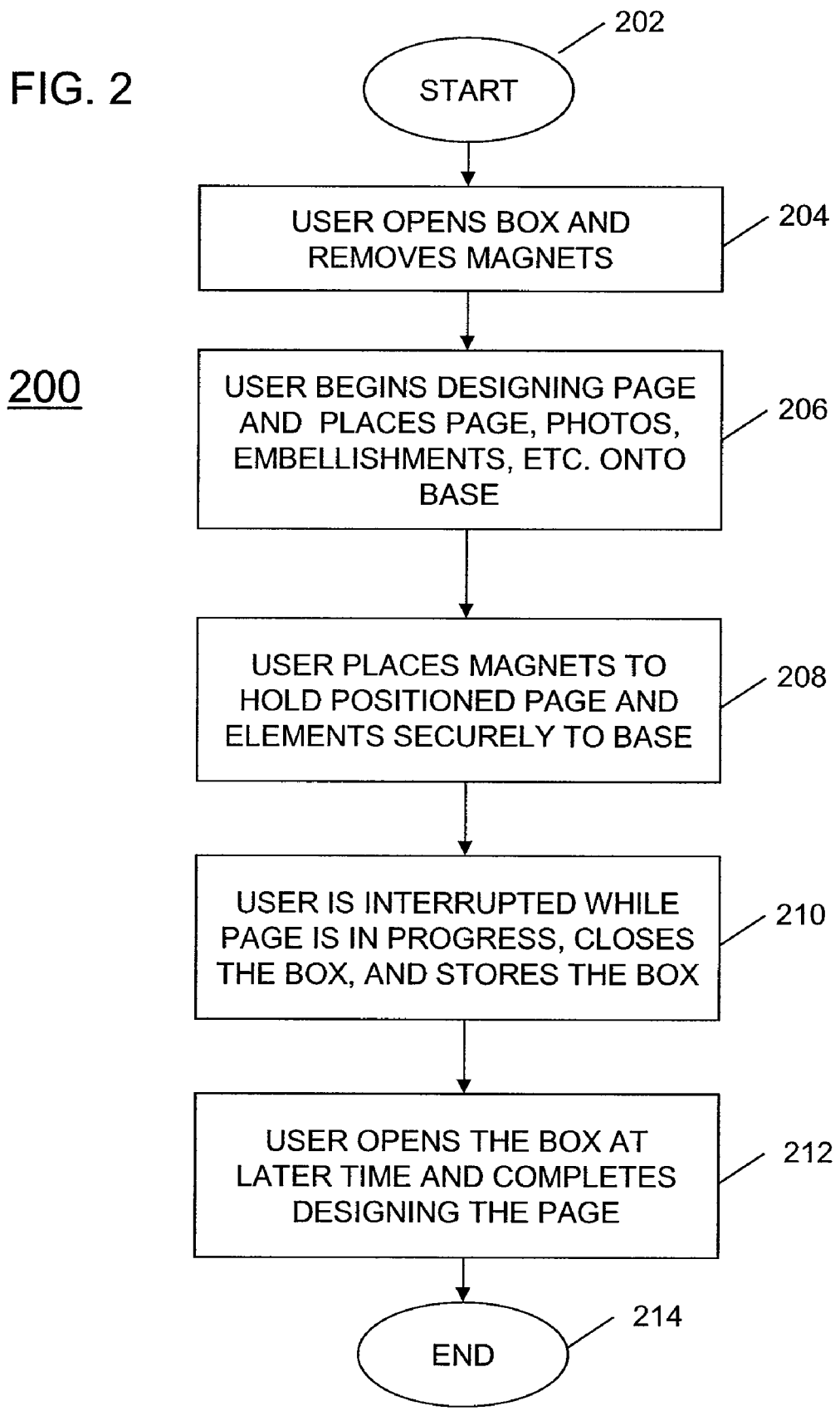
FIG. 2 presents a process flow for arranging and storing a scrapbook page, in accordance with an embodiment of the present invention.

FIG. 2 illustrates steps in a process flow 200 describing an exemplary embodiment of the present invention. The steps need not be in the sequence illustrated, and some of the steps may occur essentially simultaneously. The process 200 begins at step 202, and at step 204, a user opens a container, such as a box, to be used for preparing a scrapbook page, and removes a plurality of magnets from inside the box.

At step 206, the user places one or more pages and page-elements, such as, photos, printed items, embellishments, and the like, onto an interior base of the box, wherein the interior base comprises a magnetic substrate. The base may have one or more outlines to assist the user in placing the page-elements and designing the scrapbook page. At step 208, the user applies the plurality of magnets to hold the page-elements intact and in place.

At step 210, the user may be interrupted during the designing process and is unable to complete the page. The user may stop designing the page, close the box using a lid, and store the box until a later time. Because the page and page-elements are securely held in place by the plurality of magnets, the box may be stored horizontally, vertically, slanted, or in any manner and may be moved around, such as stored in a scrapbooking tote with other scrapbooking materials and moved about until the user may complete the page at a later time.

At step 212, the user opens the box at a later time to find the page and page-elements securely intact and placed according to the user's design prior to closing the box in step 210. The user then may complete designing the page and permanently affix the page-elements in place using an adhesive. The process ends at step 214.

Figure 3:
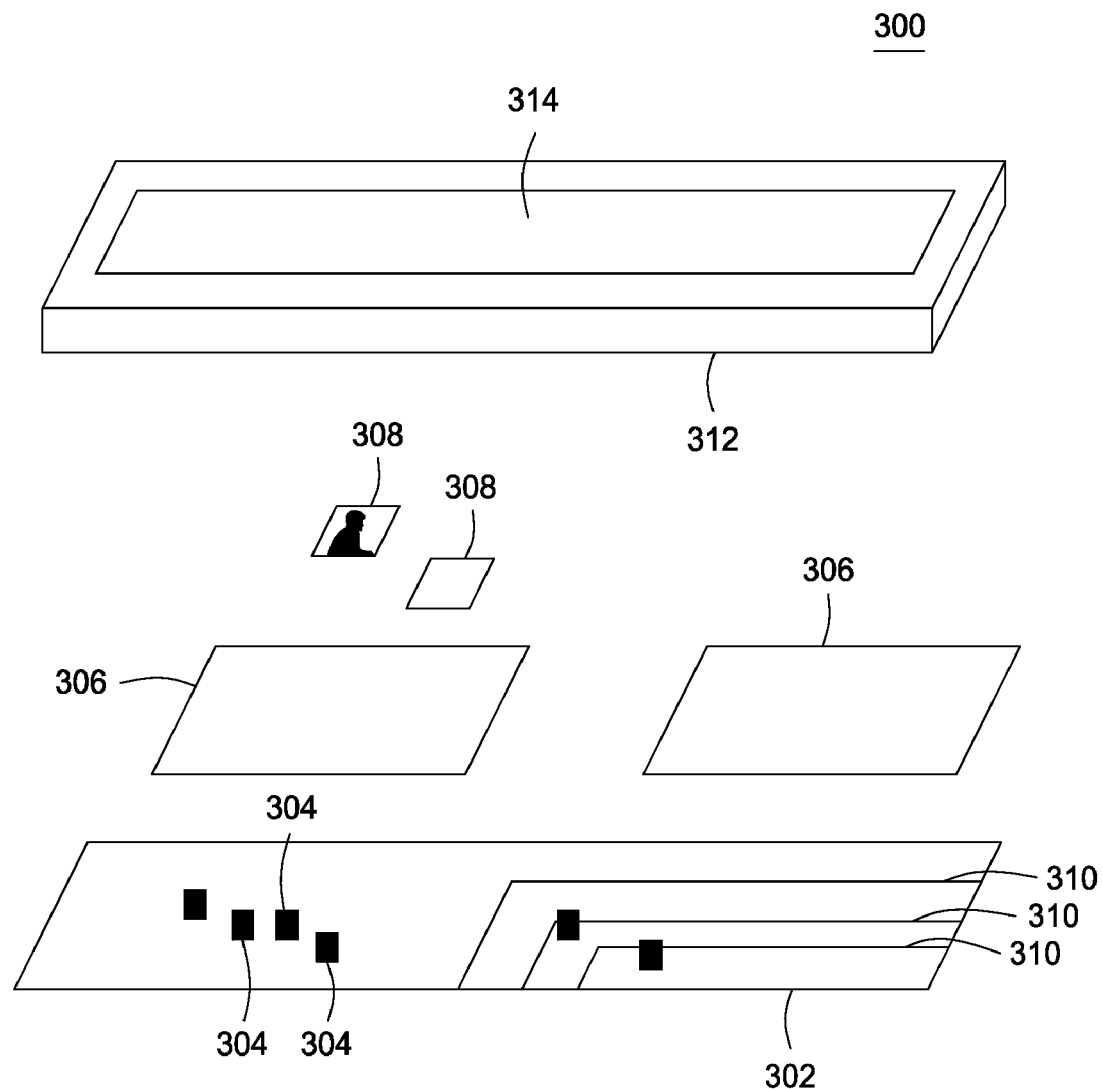
FIG. 3 is an exploded perspective view of an article for arranging and storing a scrapbook page, in accordance with an embodiment of the present invention.

FIG. 3 illustrates another embodiment of an article for arranging and storing a scrapbook page in progress. The article 300 comprises a magnetic substrate 302 sized to receive one or more scrapbook pages and a plurality of magnets 304. The magnetic substrate 302 may comprise a magnetic sheet, a magnetic board, magnetic paint applied to a support board, a magnetic grid, any combination thereof, and the like. The plurality of magnets 304 may be similar to those described in the embodiment of FIGS. 1A and 1B.

In use, one or more scrapbook pages 306 may be placed onto the magnetic substrate 302 and held in place using the magnets 304. One or more page-elements 308 then may be placed selectively onto the scrapbook pages 306 as part of a page designing process and held in place using the magnets 304. Additionally, a scrapbook page 306 or a page-element 308 may be placed onto the magnetic substrate 302 using one or more outlines 310 sized substantially similar to the sizes of common scrapbook pages. For example, a user may begin designing a scrapbook page by selectively placing one or more page-elements 308 within an outline 310, prior to placing the page-elements on a scrapbook page.

The article 300 may further include a cover 312 to securely cover the scrapbook page 306 if a user is interrupted prior to completing the scrapbook page 306. Additionally, the lid 312 may include identifying indicia of the specific scrapbook page 306 covered, such as an envelope to hold an identifying card or a plastic sleeve to hold an identifying sheet. Alternately, the lid 312 may comprise a plastic or sheer window 314, allowing a user to see the scrapbook page 306 and page-elements 308 magnetically adhered to the magnetic substrate 302.

Although the embodiments discussed herein describe a method and an article for storing an in-progress scrapbook page, the scope of the invention encompasses other embodiments where a page with elements to be affixed to is used, such as an in-progress advertising presentation, an in-progress graphic artistic page, and the like.

While the foregoing is directed to embodiments of the present invention, other and further embodiments of the present invention may be devised without departing from the basic scope thereof.

What is claimed is:

1. A method for arranging a scrapbook page or presentation that is in progress comprising the steps of:
    placing at least one scrapbook page on a magnetic substrate, wherein the magnetic substrate is sized to receive the at least one scrapbook page;
    arranging at least one page-element onto the at least one scrapbook page to create a design;
    placing at least one magnet onto the at least one page-element to temporarily hold the at least one page-element in place at a location in the design, while facilitating rearranging of the at least one page-element with respect to the at least one scrapbook page;
    removing the at least one magnet; and
    adhesively affixing the at least one page-element to the at least one scrapbook page at a substantially similar location as located in the design when held using the at least one magnet.

2. The method of claim 1, further comprising the step of covering and storing the at least one scrapbook page that is in progress prior to adhesively affixing the at least one page-element to the at least one scrapbook page.

3. The method of claim 1, further comprising the steps of:
    applying a cutting device to the at least one scrapbook page and at least one page-element;
    cutting the at least one scrapbook page using the cutting device to create a design.

4. The method of claim 3, further comprising the steps of:
    re-arranging the at least one page-element on the cut at least one scrapbook page; and
    storing the magnetic substrate with the at least one scrapbook page and the at least one page-element until the at least one scrapbook page is completed at a later time.

5. An article for arranging a scrapbook page or presentation that is in progress comprising:
    a magnetic substrate sized to receive at least one scrapbook page;
    a plurality of magnets, wherein the plurality of magnets are used to temporarily hold the at least one scrapbook page and at least one page-element in an arranged position on the at least one scrapbook page against the magnetic substrate;
    a container base sized to receive and store the magnetic substrate, the at least one scrapbook page, and the plurality of magnets while retaining the at least one page-element upon the at least one scrapbook page; and
    a container lid, being completely separate from the container base, for resting upon the container base to cover the magnetic substrate, the at least one scrapbook page, and the plurality of magnets.

6. The article of claim 5, wherein the magnetic substrate comprises a self-healing top surface material.

7. The article of claim 5, further comprising at least one outline drawn on the magnetic substrate, wherein the outline is sized substantially similar to the at least one scrapbook page.

8. The article of claim 5, wherein the magnetic substrate further comprises a grid of magnetic strips, a mesh of interwoven magnetic fibers, a thin magnetic plate, a magnetic board, magnetic paint, a magnetic grid, or any combination thereof.

9. The article of claim 5, wherein the magnetic substrate is made substantially of a galvanized metal.

10. The article of claim 5, wherein the magnetic substrate further comprises a top surface material.

11. The article of claim 10, wherein the top surface material is selected from the group consisting of paper, laminated paper, plastic materials, and non-plastic materials.

12. The article of claim 5, wherein the plastic materials comprise polyethylene polymers, polypropylene polymers, vinyl, and polyvinyl chloride.

13. The article of claim 5, wherein each of the plurality of magnets is made substantially of neodymium.

14. An article for arranging and storing a scrapbook page that is in progress comprising:
    a magnetic substrate sized to receive a scrapbook page;
    a plurality of magnets, wherein the plurality of magnets are used to hold the scrapbook page and at least one page-element in a predetermined position on the scrapbook page against the magnetic substrate;
    a portable container comprising a container base and a container lid; the container base comprises a bottom to support the magnetic substrate and a plurality of sides circumscribing and extending upwards from the bottom;
    a container lid, supported by the plurality of sides of the container base and completely separate from the container base, to cover the scrapbook page, the at least one page-element, and the plurality of magnets in the container base.

* * * * *